Sheet 1, 2 Sheets.

Phillips & Richardson.
Corn Planter.

No. 86,941. Patented Feb. 16, 1869.

Witnesses:
James Ludington
H. Ludington

Inventors:
Geo. W. Phillips
B. C. Richardson
By W. B. Smith
Their Atty

N. PETERS, PHOTO-LITHOGRAPHER, WASHINGTON, D. C.

Sheet 2. 2 Sheets.

Phillips & Richardson.
Corn Planter.

N° 86,941.      Patented Feb. 16, 1869.

WITNESSES:
James Ludington
H. Ludington

INVENTORS
Geo. W. Phillips
B. C. Richardson
By W B Smith
their atty.

N. PETERS, PHOTO-LITHOGRAPHER, WASHINGTON, D.C.

United States Patent Office.

GEORGE W. PHILLIPS AND BENJAMIN C. RICHARDSON, OF OCONOMOWOC, WISCONSIN, ASSIGNORS TO THEMSELVES AND S. H. SEAMAN, OF SAME PLACE.

Letters Patent No. 86,941, dated February 16, 1869; antedated February 11, 1869.

IMPROVEMENT IN CORN-PLANTER.

The Schedule referred to in these Letters Patent and making part of the same.

*To all whom it may concern:*

Be it known that we, GEORGE W. PHILLIPS and BENJAMIN C. RICHARDSON, of the town of Oconomowoc, county of Waukesha, and State of Wisconsin, have invented a new and useful Improvement in Corn-Planters; and we do hereby declare that the following is a full, clear, and exact description thereof, which will enable those skilled in the art to make and use the same, reference being had to the accompanying drawing, forming part of this specification, in which—

Figure 1:
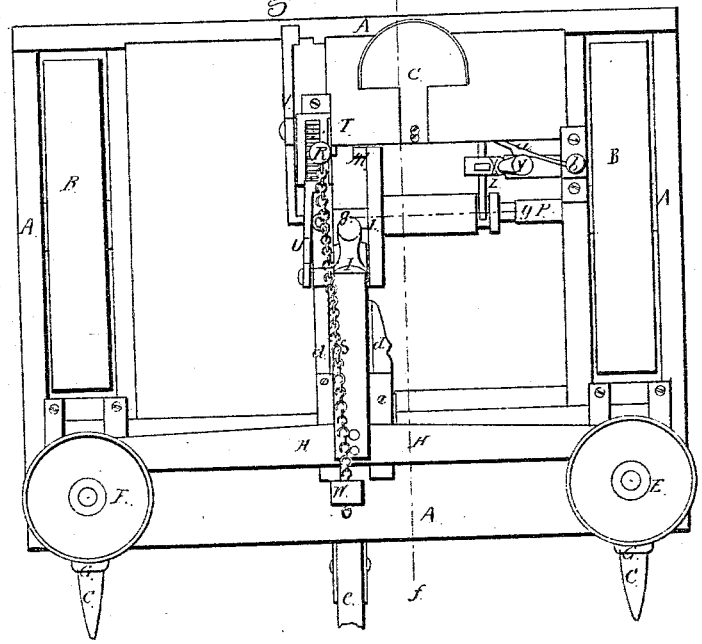
Figure 3:
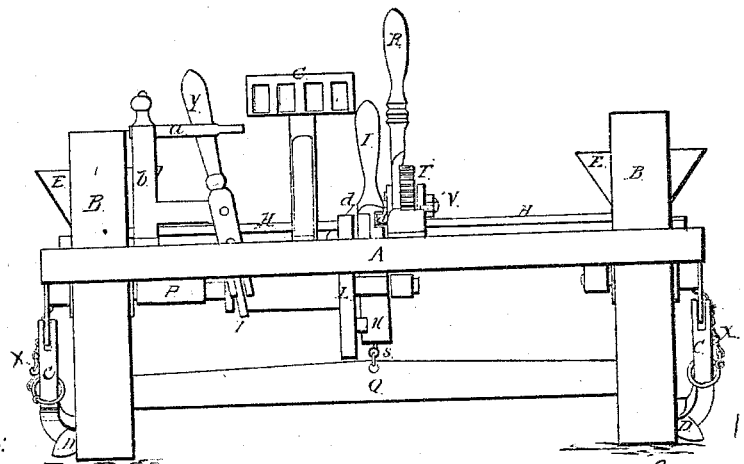
Figure 2:
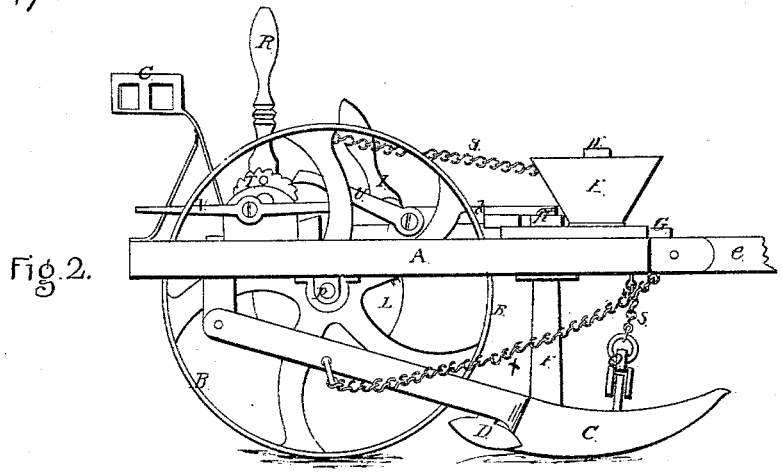
Figure 4:
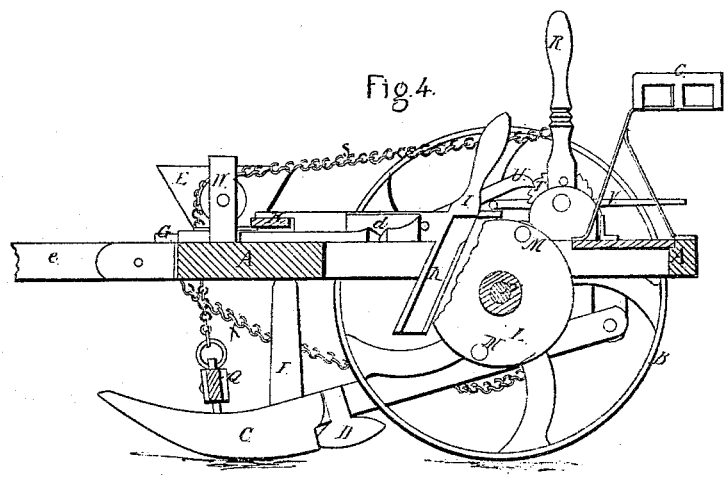
Figure 7:
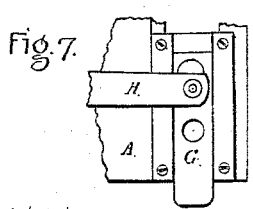
Figure 5:
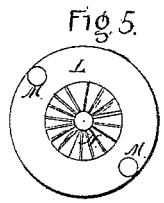
Figure 6:
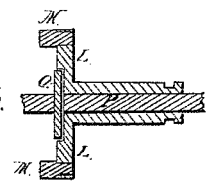

Figure 1 is a top view.
Figure 2, a side view.
Figure 3, a back view.
Figure 4, sectional view in the line $f\,f$, fig. 1.
Figure 5, disk, with serrated centre.
Figure 6, section in line $g\,g$, fig. 1.
Figure 7, a view of the dropping-measure.

Similar letters of reference, in each of the figures, indicate corresponding parts.

The object of our invention is to provide a machine for planting corn in an expeditious and perfect manner.

A is the frame-work.
B B, the moving-wheels.
C C, markers, which make indentations in the earth for the seed.
D D, scrapers, to throw the dirt over the seed after it is dropped.
E E, hoppers, in which to carry the seed on the machine for planting.
F F, conducting-pipes, through which the seed is conveyed from the hoppers to the ground.
G G, seed-droppers.
H, cross-bar, with which the droppers G G are operated.
I, lever, cam, and shaft, to which cross-bar H is attached at its centre.
K, slot in lever I, making the cam-portion of it.
L, disk on the end of a hollow shaft, through which passes the axle of one of the wheels B.
M M, pins in disk L, which operate the cam I by working through slot K.
N, serrations in disk L.
O, pin through wheel-shaft, which catches in the serrations N, when disk L is forced against it. This holds the disk, so that it will revolve with the wheel-shaft.
P, wheel-shaft.
Q, cross-bar, the ends of which are attached to markers C C.
R, lever, with which to raise the markers C C.
S, chain, one end attached to bar Q, and the other to lever R.
T, ratchet-wheel.
U, dog.
V, lever, with which to throw dog U out of the notches in wheel T.

W, post, in which is a pulley, over which chain S passes.
X X, chains, used as stays from markers C C to the frame A.
Y, lever, with which disk L is thrown out of gear.
Z, spring-keeper, one end secured to frame A, and the other forming a semicircle, fitting into a groove in the hollow shaft of disk L. This spring holds disk L against pin O.
$a$, spring-catch, to hold disk L out of gear when it is thrown out by lever Y.
$b$, a post, with a projecting arm, forming a fulcrum for lever Y. To the top of this post is secured one end of spring-catch $a$.
$c$, driver's seat.
$d$, keepers, forming a groove-slide for the shaft-part of I.
$e$, tongue, by which the planter is moved.

Operation.

The hoppers E E are filled with seed, the markers C C raised clear from the ground by pulling back on lever R, drawing on chain S. Dog U, catching into the teeth on ratchet-wheel T, holds the lever back, and the markers C C are held clear from the ground.

Hitch the team to tongue $e$, take a seat in seat $c$, throw disk L out of gear with lever Y, and drive to the field for planting.

When having reached the point to commence, put a foot on the back end of lever V and press it down. This will throw up the other end, under dog U, and throw the dog out of the notch in wheel T, releasing lever R. This permits the markers C C to fall to the ground. Then release lever Y from spring-catch $a$, and spring-keeper Z will throw disk L into gear with pin O. Then start the team, and, as the planter is drawn forward, the markers C C will make furrows for the seed. Wheels B B revolving, one of them revolves disk L by means of pin O, and, as the disk revolves, its pins M M pass through slot K, in lever I, reciprocating bar H moving back and forth with it the droppers G G, which, sliding under hoppers E E, have their pockets filled with seed, which, when pulled back, falls into the conducting-pipes, and, through them, to the furrows made by the markers C C.

These markers have slots through them, through which the conducting-pipes F F pass nearly to the ground.

As the seed falls into the furrows, the scrapers D D cover it with earth, and the wheels B B roll on and press the earth on the seed.

The pins in disk L are so regulated that the droppers G G are reciprocated just often enough to drop the seed the required distance apart. This is done by proportioning the disk L to the wheel B, and putting more or less pins, M as may be required.

What we claim as our invention, and desire to secure by Letters Patent, is—

1. Droppers G G, bar H, cam-lever I, disk L, and shaft P, all in combination, substantially as and for the purpose described.

2. Bar Q, chain S, lever R, ratchet-wheel T, dog U, and lever V, all in combination, substantially as and for the purpose described.

3. Lever Y, spring-keeper Z, and spring-catch a, in combination with disk L, substantially as described.

4. The arrangement of markers C C, scrapers D D, hoppers E E, conducting-pipes F F, droppers G G, bar H, lever I, and disk L, substantially as and for the purpose described.

5. Lever I, with its slot K, forming a cam, in combination with disk L, shaft P, and pin O, substantially as described.

GEORGE W. PHILLIPS.
BENJ. C. RICHARDSON.

Witnesses:
WARHAM PARKS,
E. HURLBUT.